No. 623,820. Patented Apr. 25, 1899.
O. PATIN.
ELECTRICALLY PROPELLED ROAD VEHICLE.
(Application filed July 28, 1898.)
(No Model.) 4 Sheets—Sheet 2.

Witnesses:

Inventor
Octave Patin
by H. B. Willson & Co.
Attorneys.

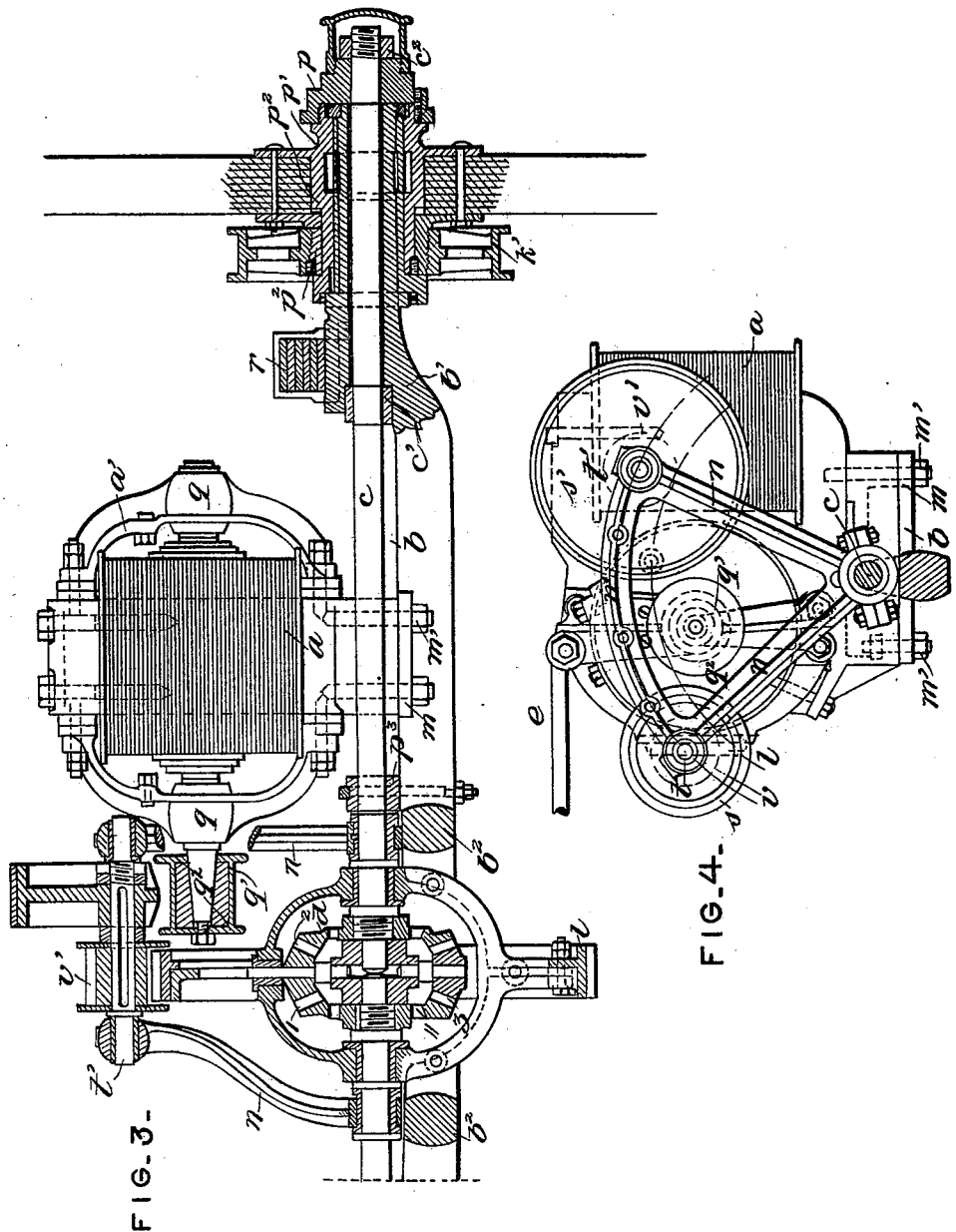

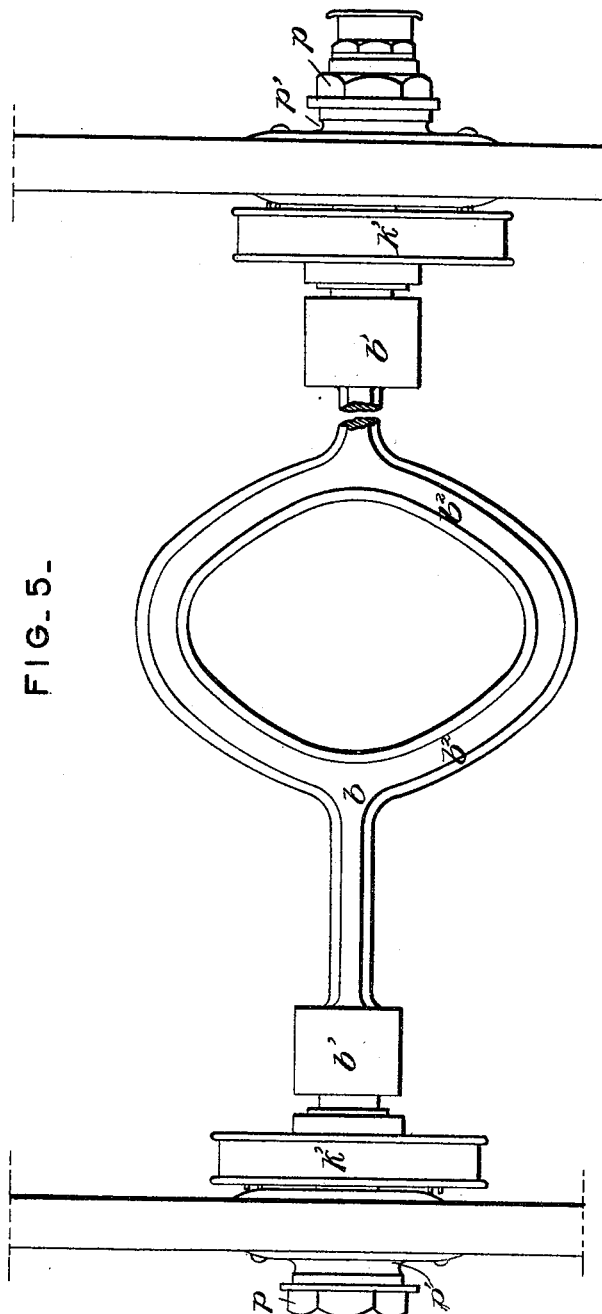

UNITED STATES PATENT OFFICE.

OCTAVE PATIN, OF PUTEAUX, FRANCE.

ELECTRICALLY-PROPELLED ROAD-VEHICLE.

SPECIFICATION forming part of Letters Patent No. 623,820, dated April 25, 1899.

Application filed July 28, 1898. Serial No. 687,145. (No model.)

*To all whom it may concern:*

Be it known that I, OCTAVE PATIN, manufacturing engineer, of No. 3 Rue du Chateau, Puteaux, Seine Department, in the Republic of France, have invented certain new and useful Improvements in Electrically-Propelled Road-Vehicles, of which the following is a specification.

My invention relates to an electrically-propelled road-vehicle chiefly characterized by the method of suspending the dynamo, which is directly fixed on the rear axle of the vehicle, the said axle being specially designed therefor, and by the device employed for changing the speed quickly and without shocks. The devices to be manipulated by the attendant are arranged within reach of the latter and comprise a hand-wheel for steering, a hand-wheel for changing the velocity, the latter hand-wheel being adapted to be fixed in various positions, a pedal for effecting the operation of an air-brake, a lever for pressing the block of a second brake against the rim of the wheel, and a second lever for mechanically changing the speed of the vehicle, the structural arrangements being such as to afford a means for combining, with the changes of speed by electric coupling, two mechanical changes of speed.

I have shown in the accompanying drawings and by way of example the main structural arrangements of my invention embodied in one particular form.

Figure 1:
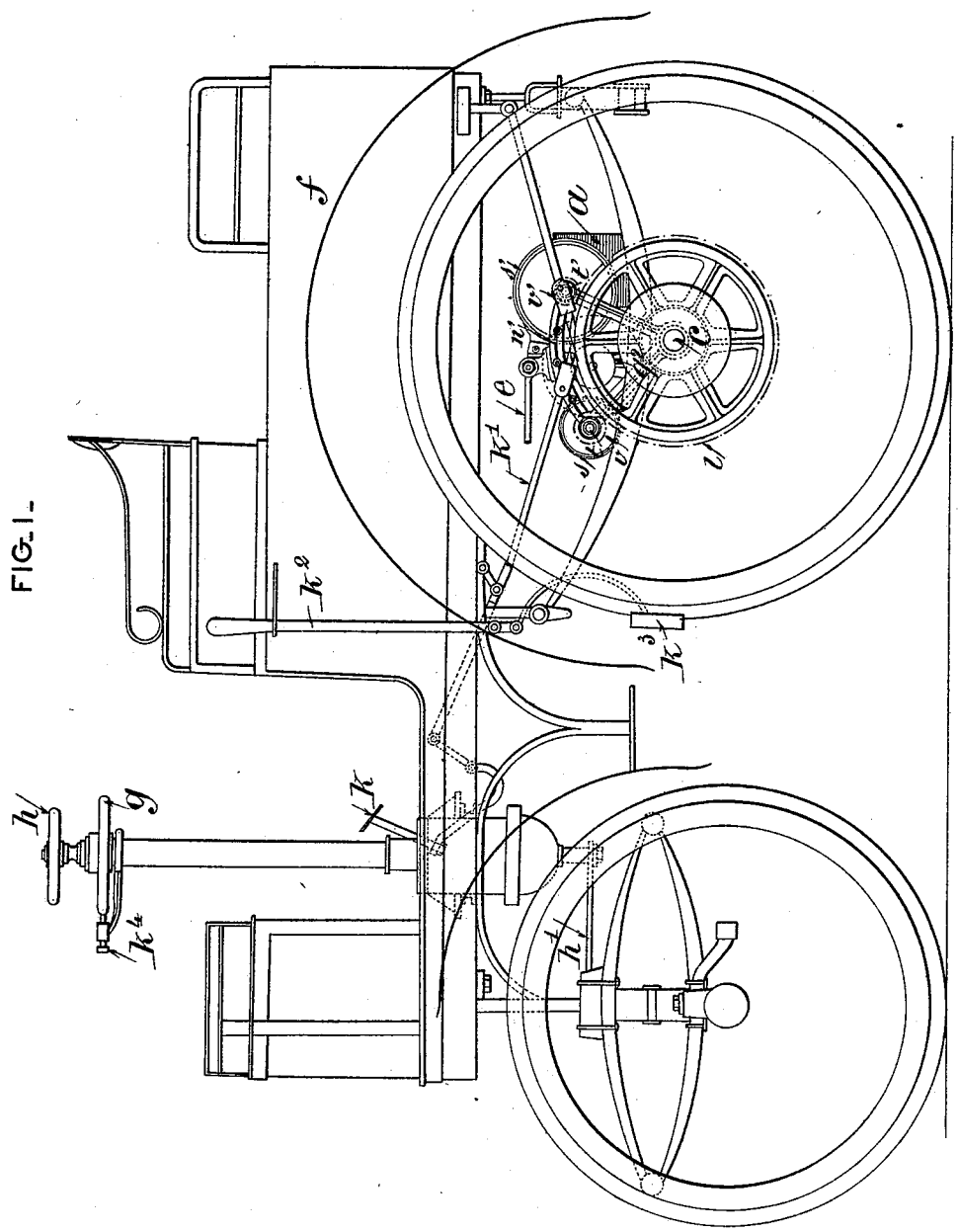
Figure 2:
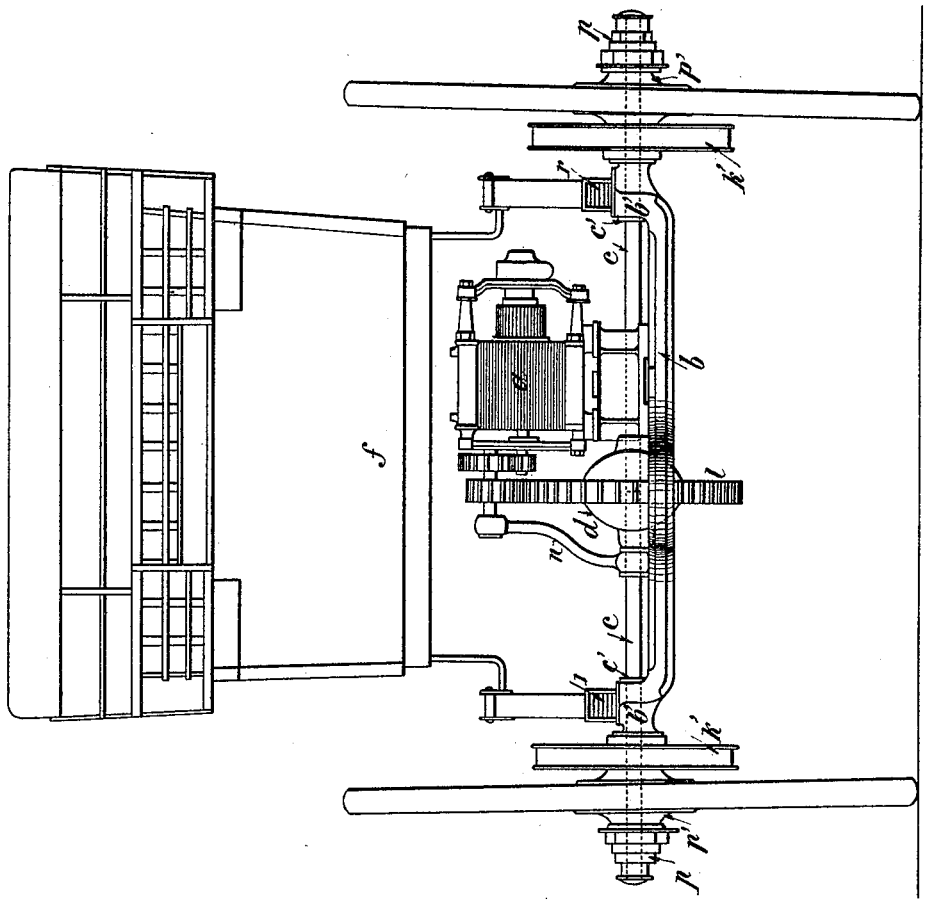

Figure 1 is a side view of the electrically-propelled road-vehicle. Fig. 2 is a corresponding rear view. Fig. 3 is a detail view, partly in section, of the rear axle of the vehicle, on which axle the dynamo is directly fixed. Fig. 4 represents the devices for changing mechanically the speed. Fig. 5 is a horizontal view of the axle $b$.

Referring to Figs. 1 and 2, showing a vehicle for containing six persons, it will be seen that the dynamo $a$ rests directly on the axle $b$ of the rear wheels. The said axle, as hereinafter described, is so arranged as to receive through it the driving-shaft $c$, to which the movement is transmitted by the differential gear $d$. This differential gear is driven at different velocities either by speed-changing gear actuated by a lever $e$, Fig. 4, adapted to give two velocities, or by changing the speed of the dynamo itself through the medium of different connections of the accumulators contained in a suitable case $f$, carried by the vehicle, these variations being effected by means of the hand-wheel $g$. The latter can be maintained in a given position by a spring-bolt $k^4$, which engages in notches formed around the periphery thereof. By employing this arrangement there is no risk of suddenly changing the velocity inadvertently. A second hand-wheel $h$, arranged in the same vertical line as the first hand-wheel $g$, controls the steering-gear $h'$ through the medium of chains or levers in the ordinary manner. A pedal $k$ enables the brake $k'$ to be actuated, the said brake being an air-brake or a band-brake operating on the rear axle. A lever $k^2$ operates a brake-block $k^3$, while the third regulating-brake is brought into action by the backward movement of the vehicle controlled by means of the hand-wheel arranged in such a manner that the said backward movement can only take place at a predetermined and sufficiently low velocity. The vehicle thus described is completed by arranging on the back of the front seat a voltmeter and an ampere-meter, so that the attendant can ascertain at any moment the conditions under which the motor is operating.

The accumulators which I employ in my vehicle are of special construction, being very light and of a capacity sufficient to supply current for the longest distances.

Figs. 3 and 4 refer to two arrangements which characterize more particularly my invention and which, combined with those I have just enumerated, simplify the construction and the handling of the electrically-propelled vehicle whether the latter is of the form shown, by way of example, or of any other form and whether the said vehicle is light or heavy, or is a small carriage, a cab, a carriage for two or for four persons, a bus, &c.

For the purpose of dispensing with the employment of any intermediate frame or support for fixing the motor, which frame or support in vehicles as now constructed encumbers and increases the weight of the vehicle, I have arranged, as above described, to support the motor directly on the rear axle of the vehicle. To this end the axle is constructed in the following manner—that is to say: At its middle part $b$, for a distance extending to the points where the suspension-springs are attached, the said axle is curved, so that at this part it is lower than at the ends $b'$, which are made hollow to allow the driving-shaft $c$ to pass therethrough. The said shaft $c$ is therefore above the body or middle part $b$ of the axle.

In the center of the vehicle the rear axle $b$ is constructed to form a frame $b^2$ oval in plan for the purpose of forming a space for the driving spur-wheel $l$ of the differential gear $d$.

The motor $a$ is fixed by bolts upon a plate or flange $m$, rigidly secured to the axle, the said motor being preferably of the kind having two collectors with two coils upon a single inductor. The construction of the motor is made as light as possible by the employment, for example, for the construction of the cheeks $a'$, which do not become fatigued, of a light metal, such as aluminium. The different devices for transmitting motion and the intermediate gear between the dynamo $a$ and the differential gear $d$ are supported by the arms D of an oscillating support hereinafter described. The driving-shaft $c$, which is rotated by the differential gear, passes through the ends of the axle and drives the wheels of the vehicle as follows: It rotates at the inner ends of the tubular parts $b'$ of the axle in bronze bearings $c'$, passes through the hollow end without touching the same, being of a less diameter than the holes through the said axle, and by means of nuts $c^2$ on its outer ends is rigidly secured to locking-sleeves $p$, which engage the naves $p^2$ of the wheels. In this manner it is obvious that as the axle $b$ is fixed it rotates at the inside the driving-shaft $c$ and at the outside the naves $p^2$ with the wheels.

The wheel of the band or air brake $k'$ is keyed on the wheel-nave. A suitable number of intermediate bearings $p^3$ may be arranged on the axle $b$ for supporting the driving-shaft.

The speed-changing gear is in my vehicle arranged in the following manner—that is to say, it depends on the application to self-propelled vehicles of a principle which has long been known and utilized in workshops and the like, but which has hitherto not been applied to self-propelled vehicles. According to this arrangement the driving is effected not by the meshing together of toothed wheels, but by the adhesion of two smooth pulleys, the one the driving-pulley and the other the driven pulley, through the medium of one or more leather bands placed between them.

The driving-shaft of the motor is supported by bearings $q$ in the cheeks $a'$ and is provided at its end with a small pulley $q'$, keyed thereto and of sufficient breadth and provided with two flanges $q^2$, which form a deep groove in which three or more leather rings can be laid, the said rings being of a diameter larger than that of the pulley which carries them. In this manner when the motor-shaft rotates rapidly the leather rings from the effect of centrifugal force turn concentrically with the pulley $q'$ and at a certain distance therefrom. In the same plane as the smooth pulley $q'$ and arranged so that they can come into contact with it I provide two other smooth pulleys of different diameters $s$ and $s'$, the former being of small diameter and the latter of large diameter, the said two pulleys being keyed upon intermediate shafts $t$ and $t'$. These shafts are carried by the ends of arms $n\,n$ of the oscillating frame $n\,n'\,n$ mentioned above, and upon each of them is keyed a toothed pinion, which toothed pinions $v\,v'$ may be of equal or unequal size and which are always in gear with the driving spur-wheel 1 of the differential gear. The bevel-pinions of the differential gear 1 2 3 4 transmit the motion of the driving-shaft $c$ in the ordinary manner.

With the above-described arrangement it is obvious that when the motor and the smooth pulley $q'$ are rotating if the actuating-lever $e$ be moved so as to oscillate the frame $n\,n'\,n$ and if the pulley $s$ is brought into contact with the pulley $q'$ the leather rings rotate the said pulley $s$ by friction, the free portions of the leather rings being applied to a sufficiently large area of the surface of the said pulley $s$ to set up considerable friction. The velocity, therefore, of the driving-shaft of the dynamo, already reduced in consequence of the relation of the radii of the two above-mentioned pulleys $q'$ and $s$, is transmitted with suitable diminution to the differential gear $d$ through the medium of the toothed pinion $v$ and of the differential spur-wheel 1, this speed corresponding to the great velocity of the mechanical change of speed. As the pulley $s'$ is of greater diameter, if by an inverse movement of the frame $n\,n'\,n$ this pulley $s'$ is brought into contact with the pulley $q$ the motion of the latter is transmitted to the wheel 1 of the differential gear by the medium of the pinion $v'$ at a still further reduced velocity. It will therefore be understood that it is only necessary to oscillate the frame or support $n\,n'\,n$ to immediately vary the velocity when the vehicle is running without the fear of shocks or of fracturing the teeth of the gear-wheels, disadvantages which are attendant on most of the ordinary speed-gears. Furthermore, this arrangement enables the motor to be put into gear when it is rotating idly at its full velocity. To this end it is only necessary to hold the two pulleys $s$ and $s'$ away from the driving-pulley $q'$ and to allow the motor to rotate. When the said motor has attained a velocity sufficient to enable it to exert a powerful action, it is connected to one of the pulleys of the frame $n\,n'\,n$, and a considerable power can be obtained, such as cannot be obtained with toothed speed-gears.

I claim—

In an electrically-propelled road-vehicle, the combination with the rear axle having a downwardly-curved portion intermediately of its hollow ends, the driving-shaft $c$ having its ends passed through the hollow ends of said rear axle, a motor supported on the depressed portion of said rear axle, the rear wheels mounted upon the ends of said driving-shaft $c$, and the band-brakes or air-brakes $k'$ $k'$ keyed on the wheel-naves near the inner ends thereof, substantially as specified.

Signed at Paris, in the Republic of France, this 1st day of July, 1898.

OCTAVE PATIN.

Witnesses:
CAMILLE BLÉTRY,
EUGENÈ WATTIER.